US008745037B2

(12) United States Patent
Zhou et al.

(10) Patent No.: US 8,745,037 B2
(45) Date of Patent: Jun. 3, 2014

(54) EXPLOITING PARTITIONING, GROUPING, AND SORTING IN QUERY OPTIMIZATION

(75) Inventors: Jingren Zhou, Bellevue, WA (US); Pre-Ake Larson, Redmond, WA (US); Ronnie Ira Chaiken, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 12/640,829

(22) Filed: Dec. 17, 2009

(65) Prior Publication Data
US 2011/0153593 A1 Jun. 23, 2011

(51) Int. Cl.
*G06F 17/30* (2006.01)

(52) U.S. Cl.
USPC ............................ 707/718; 707/719; 707/720

(58) Field of Classification Search
CPC ................... G06F 17/30445; G06F 17/30516; G06F 21/6254; G06F 21/575; G06F 9/5066
USPC .................................. 707/718, 719, 720, 721
See application file for complete search history.

(56) References Cited

U.S. PATENT DOCUMENTS

| | | | | |
|---|---|---|---|---|
| 6,353,820 B1 * | 3/2002 | Edwards et al. | ............. | 707/696 |
| 6,502,112 B1 * | 12/2002 | Baisley | ........................ | 715/210 |
| 6,704,724 B1 * | 3/2004 | Ellmann et al. | ............. | 707/718 |
| 6,775,681 B1 * | 8/2004 | Ballamkonda et al. | ....... | 707/718 |
| 7,325,010 B1 | 1/2008 | Kim | | |
| 7,890,497 B2 * | 2/2011 | Folkert et al. | ................ | 707/718 |
| 7,917,502 B2 * | 3/2011 | Cheng et al. | ................. | 707/718 |
| 7,925,646 B2 * | 4/2011 | Gao et al. | ..................... | 707/714 |
| 7,925,648 B2 * | 4/2011 | Barsness et al. | ............. | 707/720 |
| 7,958,113 B2 * | 6/2011 | Fan et al. | ...................... | 707/718 |
| 7,974,967 B2 * | 7/2011 | Scheuermann | ............... | 707/713 |
| 8,290,931 B2 * | 10/2012 | Hong et al. | .................... | 707/713 |
| 2002/0116417 A1 * | 8/2002 | Weinberg et al. | ............. | 707/517 |
| 2004/0133567 A1 | 7/2004 | Witkowski | | |
| 2005/0071331 A1 * | 3/2005 | Gao et al. | ......................... | 707/4 |
| 2005/0278357 A1 | 12/2005 | Brown | | |
| 2006/0136368 A1 * | 6/2006 | Young-Lai et al. | .............. | 707/2 |
| 2006/0218123 A1 * | 9/2006 | Chowdhuri et al. | ............. | 707/2 |
| 2007/0067274 A1 * | 3/2007 | Han et al. | ........................ | 707/4 |
| 2007/0078941 A1 * | 4/2007 | Dun et al. | ..................... | 709/217 |

(Continued)

OTHER PUBLICATIONS

Oracle 9i, Database Performance Tuning Guide and Reference, Release 2 (9.2), Oct. 2002, pp. 1-7, 1-18:21, 1-23:24, 1-29, 1:31-33, 1-37, 1-48:49, 1-52:53, 2-1, 2-15, 2-21:22, 2-25, 4-8, 4-11, 5-32, 7-3:4, 9-2, 9-7, 9-16:17, 9-26, 13-9, and 20-2.*

(Continued)

*Primary Examiner* — Hosain Alam
*Assistant Examiner* — Ahmed Abraham
(74) *Attorney, Agent, or Firm* — Dave Ream; Doug Barker; Micky Minhas (57) ABSTRACT

An optimizer uses comprehensive reasoning regarding partitioning, sorting, and grouping properties for query optimization. When optimizing an input query expression, logical exploration generates alternative logical expressions. Physical optimization explores physical operator alternatives for logical operators. Required partitioning, sorting, and grouping properties of inputs to physical operators are determined. Additionally, delivered partitioning, sorting, and grouping properties of outputs from physical operators are determined. In some embodiments, enforcer rules are employed to modify structural property requirements to introduce alternatives for consideration. Property matching identifies valid execution plans in which the delivered partitioning, sorting, and grouping properties satisfy corresponding required partitioning, sorting, and grouping properties. An execution plan having the lowest cost is selected as the optimized execution plan.

20 Claims, 5 Drawing Sheets

(56) References Cited

U.S. PATENT DOCUMENTS

| | | | |
|---|---|---|---|
| 2007/0198553 A1* | 8/2007 | Wolman | 707/100 |
| 2008/0082270 A1* | 4/2008 | Heaton et al. | 702/11 |
| 2008/0177994 A1* | 7/2008 | Mayer | 713/2 |
| 2009/0070786 A1* | 3/2009 | Alves et al. | 719/318 |
| 2009/0106189 A1* | 4/2009 | Jain et al. | 707/2 |
| 2009/0106215 A1* | 4/2009 | Jain et al. | 707/4 |
| 2009/0327254 A1* | 12/2009 | Bruno et al. | 707/4 |
| 2010/0250543 A1* | 9/2010 | Faerber et al. | 707/737 |
| 2011/0040827 A1* | 2/2011 | Katsunuma et al. | 709/203 |

OTHER PUBLICATIONS

Cruanes et al., Parallel SQL Execution in Oracle 10g, SIGMOD 2004, Jun. 13-18, 2004, five (5) pages.*

Oracle 9i, Database Performance Tuning Guide and Reference, Release 2 (9.2), Oct. 2002, pp. iv, viii, 5-20, 9-24, and 9-27:30.*

Van Bommel, et al, Reasoning About Equations and Functional Dependencies on Complex Objects—Published Date: 1994.*

Huhtala, et al., Efficient Discovery of Functional and Approximate Dependencies Using Partitions—Published Date: 1998.*

Oracle 9i, Database Performance Tuning Guide and Reference, Release 2 (9.2), Oct. 2002, pp. 1-7, 1-18:21, 1-23:24, 1-29, 1:31-33, 1-37, 1-48:49, 1-52:53, 2-1,2-15, 2-21:22, 2-25, 4-8, 4-11,5-32, 7-3:4, 9-2, 9-7, 9-16:17, 9-26, 13-9, and 20-2.*

Ahmed et al., Cost-Based Query Transformation in Oracle, VLDB Sep. 12-15, 2006, pp. 1026-1036.*

Van Bommel, et al, Reasoning About Equations and Functional Dependencies on Complex Objects—Published Date: 1994. http://citeseerx.ist.psu.edu/viewdoc/download?doi=10.1.1.92.1751&rep=rep1&type=pdf.

Huhtala, et al., Efficient Discovery of Functional and Approximate Dependencies Using Partitions—Published Date: 1998. http://reference.kfupm.edu.sa/content/e/f/efficient_discovery_of_functional_and_ap_481852.pdf.

* cited by examiner

FIG. 1

PRIOR ART

EXPLOITING PARTITIONING, GROUPING, AND SORTING IN QUERY OPTIMIZATION

BACKGROUND

Internet companies have an increasing need to store and analyze massive data sets, such as search logs, web content, and click streams collected from a variety of web services. Data analysis may involve tens or hundreds of terabytes of data. To be able to perform such massive analysis in a cost-effective manner, distributed data storage and processing platforms have been developed on large clusters of shared-nothing commodity servers. A typical cluster may include hundreds or thousands of commodity machines connected via a high-bandwidth network.

Massive data analysis on such large clusters presents new opportunities and challenges for query optimization. Query optimizers operate to generate efficient query plans that make use of all cluster resources. It is often desirable to generate parallel plans. Query optimizers in database systems typically start with an optimal serial plan and then add parallelism in a post-processing step. This approach, however, may result in sub-optimal plans.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to an optimizer that uses comprehensive reasoning surrounding structural properties, including partitioning, sorting, and grouping properties, to optimize query expressions. Given an input query expression, the optimizer performs logical exploration to generate alternative logical query expressions, each comprising a tree of logical operators. Physical optimization evaluates alternative physical operators for the logical operators of each logical query expression to identify valid execution plans. During physical optimization, required partitioning, sorting, and grouping properties of inputs to physical operators are derived. Additionally, delivered partitioning, sorting, and grouping properties of outputs from physical operators are derived. In some embodiments, enforcer rules are employed to modify structural property requirements to introduce alternatives for consideration. Property matching is performed to verify whether delivered structural properties satisfy corresponding required structural properties and identify valid execution plans. Costs associated with each valid execution plan are estimated, and an execution plan with the lowest cost is selected.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an optimizer that uses comprehensive reasoning regarding partitioning, grouping, and sorting properties in query optimization. Formal semantics for partitioning, grouping, and sorting properties are described herein, and a set of inference rules are introduced that also exploit functional dependencies and data constraints. Embodiments also employ optimization enforcer rules and techniques to seamlessly generate and optimize both serial and parallel plans in an optimizer. In some embodiments, the optimization rules enable optimizing parallel query plans natively in the traditional optimization architecture.

Embodiments of the present invention combine reasoning about partitioning, grouping, and sorting properties into a single uniform framework. The following description describes how to derive the properties of the results of various relational operators, how to determine required properties for a physical operator, and how to match different structural properties. The approach described herein may be employed in optimizing parallel query plans in the context of cloud-scale computation to greatly improve query performance.

Accordingly, in one aspect, an embodiment of the present invention is directed to one or more computer storage media storing computer-useable instructions that, when used by one or more computing devices, cause the one or more computing devices to perform a method. The method includes receiving an input query expression and a set of one or more physical property requirements, the input query expression being represented as an operator tree comprising a plurality of logical operators. The method also includes performing logical exploration by applying transformation rules to generate logical query expressions with varying logical operators. The method furthering includes performing physical optimization for each logical query expression by applying implementation rules to convert logical operators to physical operators. Physical optimization includes, for each physical operator considered for each logical operator, determining delivered structural properties output by the physical operator. The delivered structural properties include a partitioning property, a sorting property, and a grouping property. Physical optimization also includes, for each physical operator considered for each logical operator, determining required structural properties as inputs for the physical operator. The required structural properties include a partitioning property, a sorting property, and a grouping property. Physical optimization further includes determining whether delivered structural properties satisfy corresponding required structural properties. Physical optimization still further includes identifying valid execution plans in which delivered structural properties satisfy required structural properties. The method also includes estimating costs associated with each of the valid execution plans and selecting, from the valid execution plans, an execution plan having a lowest cost as an optimized execution plan.

In another embodiment of the present invention, an aspect is directed to one or more computer storage media storing software components useable by one or more computing devices to provide query optimization. The software components include a required properties component, a delivered properties component, and a property matching component. The required properties component determines required structural properties for physical operators being considered during query optimization. The required structural properties include structural property requirements of inputs to the physical operators, including partitioning properties, grouping properties, and sorting properties. The delivered properties component determines delivered structural properties for the physical operators. The delivered structural properties include structural properties of outputs from the physical operators, including partitioning properties, grouping properties, and sorting properties. The property matching component determines whether delivered structural properties satisfy required structural properties to identify one or more valid execution plans.

A further embodiment of the present invention is directed to one or more computer storage media storing computer-useable instructions that, when used by one or more computing devices, cause the one or more computing devices to perform a method. The method includes determining whether a first physical operator can provide an output that satisfies a particular structural property requirement. If the first physical operator can provide an output that satisfies the particular structural property requirement, the method includes considering the first physical operator for optimization and pushing structural property requirements imposed by the first physical operator to child expressions. If the first physical operator cannot provide an output that satisfies the particular structural property requirement but can preserve the structural properties, the method includes considering the first physical operator for optimization and pushing the particular structural property requirement to child expressions. Additionally, if the first physical operator cannot provide an output that satisfies the particular structural property requirement, the method includes considering the first physical operator for optimization, adding a new physical operator that satisfies the particular structural property requirement, and optimizing child expressions without imposing the particular structural requirement on child expressions.

Figure 1:
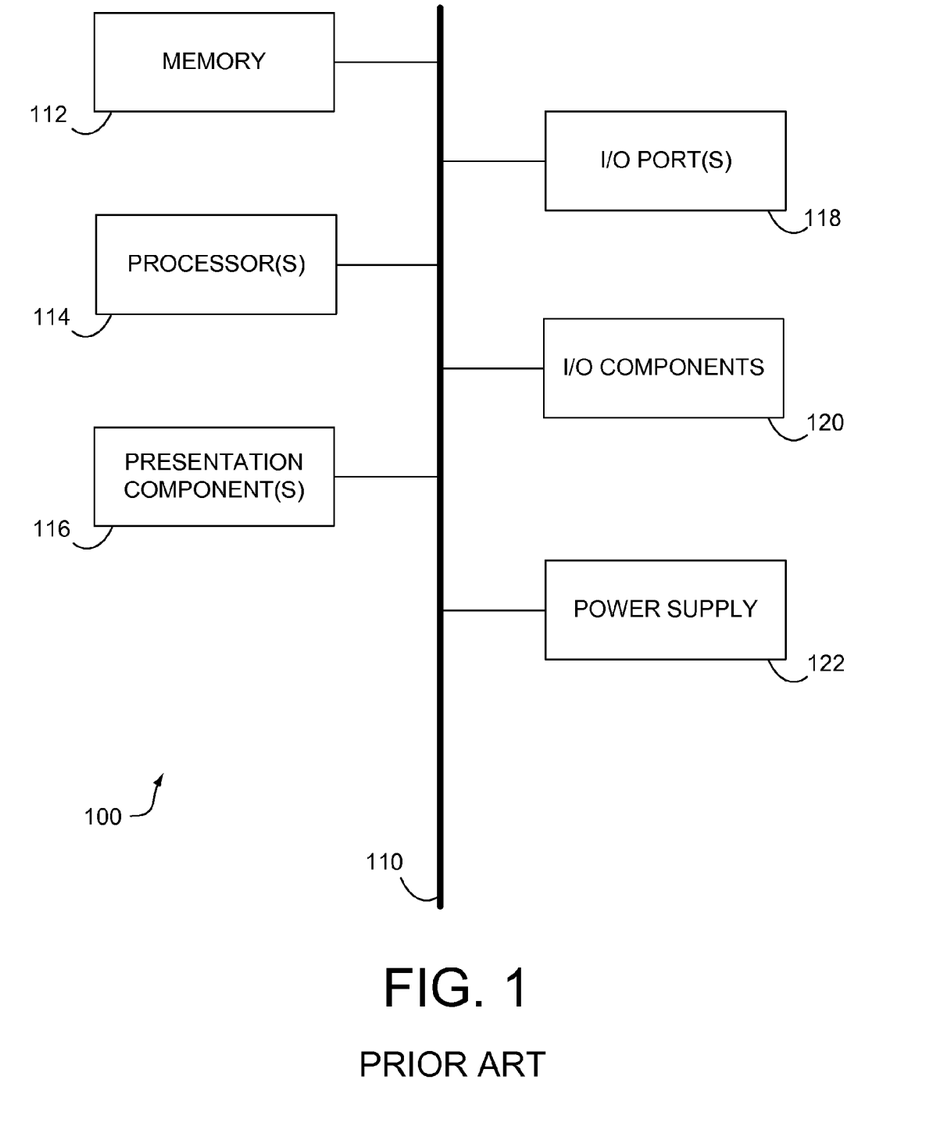
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Parallel Plans and Exchange Operators

Distributed query processing is based on partitioning data into smaller subsets and processing partitions in parallel on multiple machines. This requires operators for splitting a single input into smaller partitions, merging multiple partitions into a single output, and repartitioning an already partitioned input into a new set of partitions. This can done by a single logical operator, the data exchange operator, that reparations data from n inputs to m outputs. For example, n=1 corresponds to initial partitioning of a single input, and m=1 corresponds to merging n inputs into a single output. After an exchange operator, the data is partitioned into m subsets that are then processed independently and in parallel using standard relational operators, until the data flows into the next exchange operator. Parallelism can be added easily in this way without modification to other relational operators.

At the implementation level, exchange consists of one or two physical operators: a partition operator and/or a merge operator. Suppose we want to reparation n input partitions, each one on a different machine, into m output partitions on a different set of machines. The processing is done by n partition operators, one on each input machine, and m merge operators, one on each output machine. A partition operator reads its input and splits it onto m subpartitions. Each merge operator collects the data for its partition from the n corresponding subpartitions.

To integrate consideration of parallel plans into the optimizer, embodiments of the present invention are able to reason about physical properties of data streams flowing between physical operators; how the data is partitioned, sorted and/or grouped. This includes understanding what requirements different operators have on their inputs, what effect they have on the physical properties of their outputs, and deciding whether the physical properties of data delivered by an operator satisfy the requirements of a consuming operator.

The following discussion classifies exchange operators according to the topology of their data flows and describes the different partition and merge operators that may be employed within some embodiments of the present invention.

A. Exchange Topology

Figure 2:
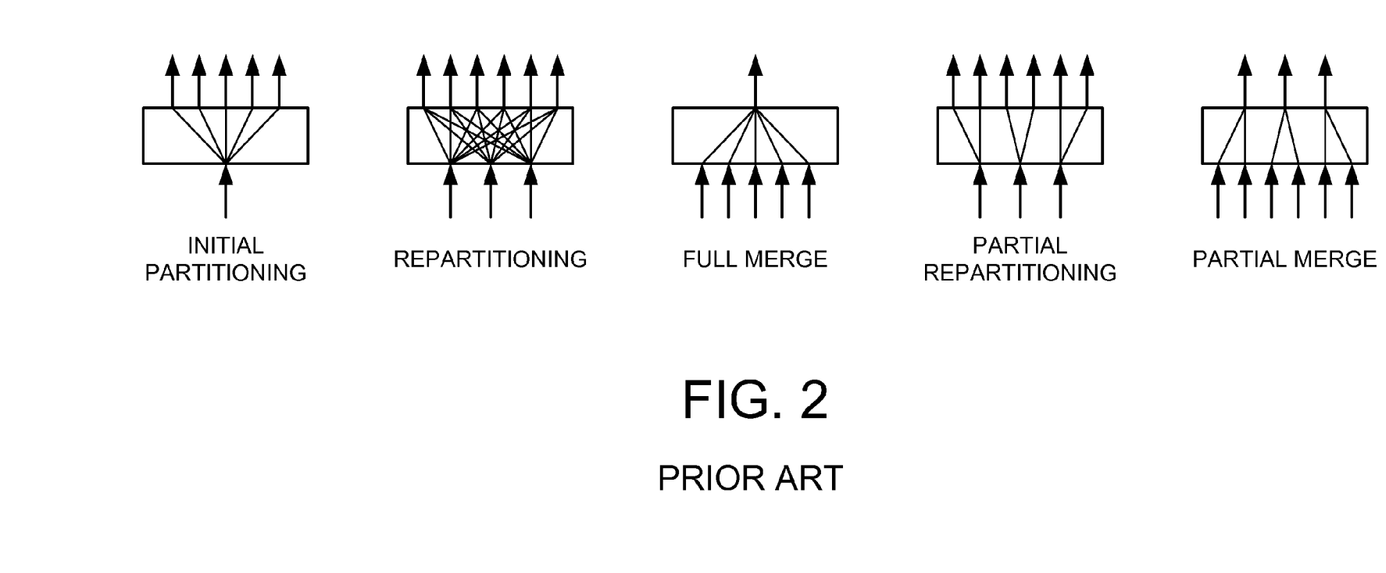
FIG. 2 is a diagram showing different types of data exchange operators.

FIG. 2 shows five types of exchange operators that are described in further detail below:

Initial Partitioning: This operator consumes a single input stream and outputs m output streams with the data partitioned among the m streams.

(Full) Repartitioning: This operator consumes n input partitions and produces m output partitions, partitioned in a different way.

Full Merge: This operator consumes n input streams and merges then into a single output stream.

Partial Partitioning: This is a special case of repartitioning. It takes n input streams and produces kn output streams. The data from each input partition is further partitioned among k output streams.

Partial Merge: This is the inverse of partial partition. A partial merge takes kn input streams, merges groups of k of them together, and produces n output streams.

B. Partitioning Schemes

Conceptually, an instance of a partition operator takes one input stream and generates multiple output streams. It consumes one row at a time and writes the row to the output stream selected by a partitioning function applied to the row. For purposes of discussion herein, it is assumed all partition operators are FIFO (first-in, first-out), that is, the order of two rows $r_1$ and $r_2$ in the input stream is preserved in the output stream if they are assigned to the same partition. There are several different types of partitioning schemes.

Hash Partitioning applies a hash function to the partitioning columns to generate the partition number to which the row is output. This partitioning scheme results in non-ordered partitions.

Range Partitioning divides the domain of the partitioning columns into a set of disjoint ranges, as many as the desired number of partitions. A row is assigned to the partition determined by the value of its partitioning columns. This partitioning scheme produces ordered partitions.

Non-deterministic Partitioning is any scheme where the data content of a row does not affect which partition the row is assigned to. Round-robin partitioning and random partitioning are examples of this type.

Broadcasting takes one row at a time and outputs a copy of the row to every partition, that is, every output stream is a copy of the input stream. Broadcasting is typically used only on small, non-partitioned inputs. The partition function to use and the number of output partitions are other aspects of exchange operators. It is up to the optimizer to make an optimal choice, based on data cardinalities and appropriate models for CPU, disk, and network costs.

C. Merging Schemes

A merge operator combines data from multiple input streams into a single output stream. Depending on whether the input streams are sorted individually and how rows from different input streams are ordered, there are several types of merge operations.

Random Merge randomly pulls rows from different input streams and merges them into a single output stream. While the ordering of rows from the same input stream is preserved, the ordering of rows from different inputs is indeterminate.

Sort Merge takes a list of sort columns as a parameter and a set of input streams sorted on the same columns. The input streams are merged together into a single sorted output stream.

Concat Merge concatenates multiple input streams into a single output stream. It consumes one input stream at a time and outputs its rows in order to the output stream. That is, it maintains the row order within an input stream but it does not guarantee the order in which the input streams are consumed.

Sort-Concat Merge is a sorted version of concat merge. It takes a list of sort columns as a parameter. First, it picks one row (usually the first one) from each input stream, sorts them on the values on the sort columns, and uses the row order to decide the order in which to concatenate the input streams. This is useful for merging range-partitioned inputs into a totally ordered output.

Property Formalism

Functional dependencies and a few other constraints are briefly reviewed below. Partitioning, grouping, and sorting properties used in embodiments of the present invention are also formally defined. Further, a set of inference rules used in embodiments are summarized.

A. FDs, Constraints and Equivalences

A set of columns $R=\{R_1, R_2, \ldots, R_n\}$ functionally determines a set of columns $S=\{S_1, S_2, \ldots, S_m\}$, if for any two rows that agree on the values of columns in R, they also agree on the values of columns in S. Functional dependency is denoted herein by $R \rightarrow S$. $R \rightarrow S$ is simply a shorthand notation for $R \rightarrow S_1, R \rightarrow S_2, \ldots, R \rightarrow S_m$.

Functional dependencies can arise in several ways.

Trivial FDs: $R \rightarrow R'$ whenever $R \supset R'$.

Key constraints: Keys are a special case of functional dependencies. If X is a key of relation T, then X functionally determines every column of T.

Column equality constraints: A selection or join with a predicate $R_i = S_k$ implies that the functional dependencies $\{R_i\} \rightarrow \{S_k\}$ and $\{S_k\} \rightarrow \{R_i\}$ hold in the result.

Constant constraints: After a selection with a predicate $R_i$=constant, all rows in the result have the same value for column $R_i$. This can be viewed as a functional dependency which is denoted by $\emptyset \rightarrow R_i$.

Grouping columns: After a group-by with grouping columns R, R is a key of the result and, thus, functionally determines all other columns in the result.

A set of columns that are known to have the same value in all tuples of a relation belong to a column equivalence class. An equivalence class may also contain a constant c, which implies that all columns in the class have the value c. Equivalence classes are generated by equality predicates, typically equijoin conditions and equality comparisons with a constant.

Functional dependencies and column equivalence classes can be computed bottom up in an expression tree. As this is known to those skilled in the art, details are omitted herein but it is assumed that functional dependencies and equivalence classes have been computed.

B. Structural Properties

Embodiments of the present invention define three properties describing the structure or layout of a relation: partitioning, grouping and sorting, collectively referred to as structural (data) properties. A relation can be a source table or a result produced by a query expression. Table I summarizes some of the notation used herein.

TABLE I

Notation

| | |
|---|---|
| R, S, ... | Relations |
| $C_1, C_2, \ldots$ | Columns |
| X, Y, ... | Sets of columns |
| X ≡ Y | Column sets are equal taking into account column equivalence |
| $r_1, r_2, \ldots$ | Tuples |
| $P_1, P_2$ | Partitions |
| r[C], r[X] | Projection of r onto column C and columns X, respectively |

TABLE I-continued

Notation

| | |
|---|---|
| * | Any properties (including empty) |

A partition operation divides a relation into disjoint subsets, called partitions. A partition function defines which rows belong to which partitions. Partitioning applies to the whole relation; it is a "global structural property." Grouping and sorting properties define how the data within each partition is organized and are thus partition-local properties, herein referred to as "local structural properties."

We first specify what it means for a sequence of rows to be grouped or sorted and then formally define local structural properties.

Definition 1 (Grouping)

A sequence of rows $r_1, r_2, \ldots, r_m$ is grouped on a set of columns $X=\{C_1, C_2, \ldots, Cn\}$, if $\forall r_i, r_j, i<j, r_i[X]=r_j[X] \Rightarrow \forall k, i<k<j, r_k[X]=r_i[X]$. Grouping is denoted by $X^g$.

Definition 2 (Sorting)

A sequence of rows $r_1, r_2, \ldots, r_m$ is sorted on a column C in an ascending (or descending) order, if $\forall r_i, r_j, i<j \Rightarrow r_i[C] \leq r_j[C]$ (or $r_i[C] \geq r_j[C]$). This ordering is denoted by $C^o$ where $o \in \{o\uparrow, o\downarrow\}$.

Note that grouping is performed on a set of columns and the column order within the set does not matter while sorting is performed on a list of columns and the column order matters.

Local structural properties can be represented by an ordered sequence of actions $\{\hat{A}_1, \hat{A}_2, \ldots, \hat{A}_m\}$. Each action is either grouping on a set of columns $X^g$, or sorting on a single column $C^o$. The definitions of grouping and sorting actions follow.

Definition 3 (Grouping Action)

A sequence of rows $r_1, r_2, \ldots, r_n$ satisfies the local structural properties $\{\hat{A}_1, \ldots, \hat{A}_m, X^g\}$ if it satisfies the properties $\{\hat{A}_1, \ldots, \hat{A}_m\}$ and, in addition, $\forall r_i, r_j, i<j, r_i[\hat{A}_1, \ldots, \hat{A}_{m-1}, X]=r_j[\hat{A}_1, \ldots, \hat{A}_{m-1}, X] \Rightarrow \forall k, i<k<j, r_k[\hat{A}_1, \ldots, \hat{A}_{m-1}, X]=r_i[\hat{A}_1, \ldots, \hat{A}_{m-1}, X]$.

Definition 4 (Sorting Action)

A sequence of rows $r_1, r_2, \ldots, r_n$ satisfies the local structural properties $\hat{A}_1, \ldots, \hat{A}_{m-1}, C^o$ where $o \in \{o\uparrow, o\downarrow\}$, if it satisfies the properties $\{\hat{A}_1, \ldots, \hat{A}_{m-1}\}$ and, in addition, $\forall r_i, r_j, i<j, r_i[\hat{A}_1, \ldots, \hat{A}_{m-1}]=r_j[\hat{A}_1, \ldots, \hat{A}_{m-1}] \Rightarrow r_i[C]$ op $r_j[C]$ where op='≤' when o=o↑ and op='≥' when o=o↓.

There are two major classes of partitioning schemes, ordered and non-ordered. A non-ordered partitioning scheme ensures only that all rows with the same values of the partitioning columns are contained in the same partition. This is analogous to grouping as local property. An ordered partitioning scheme provides the additional guarantee that the partitions cover disjoint ranges of the partitioning columns. In other words, rows assigned to a partition $P_i$ are either all less than or greater than rows in another partition $P_j$. This is analogous to ordering as a local property.

The following definitions formally state what properties are guaranteed by different partitioning schemes.

Definition 5 (Non-ordered Partitioning)

A relation R is non-ordered partitioned on columns X, if it satisfies the condition $\forall r_1, r_2 \in R: r_1[X]=r_2[X] \Rightarrow P(r_1)=P(r_2)$ where P denotes the partitioning function used.

Definition 6 (Ordered Partitioning)

A relation R is ordered-partitioned into partitions $P_1, P_2, \ldots, P_m$ on columns $\{C_1^{o_1}, C_2^{o_2}, \ldots, C_n^{o_n}\}$ where $o_i \in \{o\uparrow, o\downarrow\}$, if it satisfies the condition in the previous definition and the additional condition $\forall P_i, P_j, i \neq j: (\forall r_1 \in P_i, r_2 \in P_j: r_1 < c_1^{o_1}, c_2^{o_2}, \ldots, c_n^{o_n} r_2)$ or $(\forall r_1 \in P_i, r_2 \in P_j: r_1 > c_1^{o_1}, c_2^{o_2}, \ldots, c_n^{o_n} r_2)$.

An ordered partitioning can be achieved by range partitioning while several methods produce a non-ordered partitioning.

Definition 7 (Structural Properties)

The structural properties of a relation R can be represented by partitioning information and an ordered sequences of actions, $\{P^\Theta; \{\hat{A}_1, \hat{A}_2, \ldots, \hat{A}_n\}\}$ where $o \in \{o, g\}$, meaning ordered and non-ordered partitioning. The first part defines its global structural property while the second sequence defines its local structural property.

Empty structural properties are allowed. $\{\bot; *\}$ indicates that data is not partitioned while $\{\emptyset; *\}$ indicates that data is randomly partitioned. Another special case is $\{T; *\}$, which indicates that data is completely duplicated and each partition contains a complete copy of the data. The exact partitioning function or the number of partitions are not needed so they are not specified in Definition 7.

Table II shows an instance of a relation with three columns $C_1$, $C_2$, $C_3$ and structural properties $\{\{C_1\}^g; \{\{C_1, C_2\}^g, C_3^o\}\}$. In words, the relation is partitioned on column $C_1$ and, within each partition, data is first grouped on columns $C_1, C_2$, and, within each such group, sorted by column $C_3$.

TABLE II

Example Relation with Partitioning, Grouping, and Sorting

| Partition 1 | Partition 2 | Partition 3 |
|---|---|---|
| {1, 4, 2}, {1, 4, 5}, {7, 1, 2} | {4, 1, 5}, {3, 7, 8}. {3, 7, 9} | {6, 2, 1}, {6, 2, 9} |

C. Inference Rules

Inference rules for structural properties will now be discussed. The first rule shows that local properties can be truncated.

$$\{*; \{\hat{A}_1, \ldots, \hat{A}_{m-1}, \hat{A}_m\}\} \Rightarrow \{*; \{\hat{A}_1, \ldots, \hat{A}_{m-1}\}\} \quad (1)$$

Global properties cannot be truncated but they can be expanded. A result that is partitioned on columns $C_1, C_2$ is not partitioned on $C_1$ because two rows with the same value for $C_1$ may be in different partitions. However, a result partitioned on $C_1$ alone is in fact partitioned on $C_1, C_2$ because two rows that agree on $C_1, C_2$ also agree on $C_1$ alone and, consequently, they are in the same partition. This observation gives the following two rules.

$$\{\{C_1, C_2, \ldots, C_m\}^g; *\} \Rightarrow \{\{C_1, C_2, \ldots, C_m, C_{m+1}\}^g; *\} \quad (2)$$

$$\{\{C_1^o, C_2^o, \ldots, C_m^o\}; *\} \Rightarrow \{\{C_1^o, C_2^o, \ldots, C_m^o, C_{m+1}^o\}; *\} \quad (3)$$

If a sequence of rows is sorted, it is also grouped. This yields two rules.

$$\{*; \{\hat{A}_1, \ldots, C^o, \ldots, \hat{A}_{m-1}\}\} \Rightarrow \{*; \{\hat{A}_1, \ldots, C^g, \ldots, \hat{A}_m\}\} \quad (4)$$

$$\{\{C_1^o, C_2^o, \ldots, C_n^o\}; *\} \Rightarrow \{\{C_1, C_2, \ldots, C_n\}^g; *\} \quad (5)$$

Functional dependencies allow us to eliminate grouping and sorting columns. The following two simplification rules can be applied to global properties and to individual actions in local properties.

$$\exists C \in X: (X - \{C\}) \to C, X^g \Rightarrow (X - \{C\})^g \quad (6)$$

$$\exists \{C_1, \ldots, C_{j-1}\} \to C_j: \{C_1^o, \ldots, C_{j-1}^o, C_j^o, C_{j+1}^o, \ldots\} \Rightarrow \{C_1^o, \ldots, C_{j-1}^o, C_{j+1}^o, \ldots\} \quad (7)$$

However, the following rule applies only to local structural properties, where Columns returns a set of columns defined in actions.

$$\exists \text{Columns}[\hat{A}_1, \ldots, \hat{A}_{i-1}] \to \text{Columns}[\hat{A}_i]: \{*; \{\hat{A}_1, \ldots, \hat{A}_{i-1}, \hat{A}_i, \hat{A}_{i+1}, \ldots\}\} \{*; \{\hat{A}_1, \ldots, \hat{A}_{i-1}, \hat{A}_i, \hat{A}_{i+1}, \ldots\}\} \quad (8)$$

Property Reasoning Insider the Optimizer

Conceptually, an optimizer generates all possible rewritings of a query expression and chooses the one with the lowest estimated cost. Query expressions are represented as operator trees. Operators are of two types: logical and physical. A logical operator specifies what operation to perform but not the algorithm, while a physical operator also specifies the algorithm. For example, join is a logical operator, while hash join, merge join, and nested-loop join are physical operators.

Transformation-based optimization can be viewed as divided into two phases, namely, logical exploration and physical optimization. Logical exploration applies transformation rules that generate new logical expressions. During physical optimization, implementation rules are applied that convert logical operators to physical operators. Algorithm 1 below shows a (simplified) recursive optimization routine that takes as input a query expression and a set of requirements and returns an optimized execution plan.

```
Algorithm 1: OptimizeExpr(expr, reqd)
Input: Expression expr, ReqdProperties reqd
Output: QueryPlan plan
/*Enumerate all the possible logical rewrites */
LogicalTranform(expr);
foreach logical expression lexpr do
    /*Try out implementations for its root operator */
    PhysicalTranform(lexpr);
    foreach expression pexpr that has physical
    implementation for its root operator do
        ReqdProperties reqdChild =
        DetermineChildReqdProperties(pexpr, reqd);
        /*Optimize child expressions */
        QueryPlan planChild =
        OptimizeExpr(pexpr.Child, reqdChild);
        DlvdProperties dlvd =
        DeriveDlvdProperties(planChild);
        if PropertyMatch(dlvd, reqd) then
            EnqueueToValidPlans( );
        end
    end
end
plan = CheapestQueryPlan( );
return plan;
```

Discussed below are three different contexts where reasoning about data properties occur during query optimization (which are discussed in further detail in following sections).

Determining child required properties. The parent physical operator imposes requirements that the output from the current physical operator must satisfy, for example, the data must be sorted on R.b. To function correctly, the operator may itself impose certain requirements on its inputs, for example, the two inputs to a join must be partitioned on R.a and S.a, respectively. Based on these two requirements, it must then be determined what requirements to impose on the result of the input expressions. The function DetermineChild ReqdProperties is used for this purpose. If the requirements are incompatible, a compensating operator such as a sort or partition may need to be added.

Deriving Delivered Properties.

Once physical plans for the child expressions have been determined, the data properties of the result of the current physical operator are computed by calling the function DeriveDlvdProperties. A child expression may not deliver exactly the requested properties. For example, we may have requested a result grouped on R.a but the chosen plan delivers a result that is, in addition, sorted on R.a. The delivered properties are a function of the delivered properties of the inputs and the behavior of the current operator, for example, whether it is hash or merge join.

Property Matching.

Once the delivered properties have been determined, whether they satisfy the required properties is tested by calling the function PropertyMatch. If they do not match, the plan with the current operator is discarded. The match does not have to be exact—a result with properties that exceed the requirements is acceptable.

Deriving Delivered Properties

How to derive the structural properties of the output of a physical operator will now be discussed. Earlier research has shown how to derive ordering and grouping properties for standard relational operators executed on non-partitioned inputs. Ordering and grouping are local properties, that is, properties of each partition, so previous work still applies when the operators are running in partitioned mode. Standard relational operators have no effect on partitioning. What remains is to derive global and local properties after a physical partition, merge, or reparation operator.

A. Properties After a Partitioning Operator

Partition operators are assumed to be FIFO, that is, they output rows in the same order that they are read from the input. Thus, they affect the global properties but not local properties. Every output partition inherits the local properties (sorting, grouping) of its input. Table III summarizes the properties of the output after a partition operator when the input has properties $\{X; Y\}$.

TABLE III

Structural Properties of the Result after Partitioning an Input with Properties $\{X; Y\}$

| Scheme | Result |
|---|---|
| Hash on $C_1, \ldots, C_n$ | $\{\{C_1 \ldots, C_n\}^g; Y\}$ |
| Range on $C_1^o, \ldots, C_n^o$ | $\{\{C_1^o, \ldots, C_n^o\}; Y\}$ |
| Non-Deterministic | $\{\emptyset; Y\}$ |
| Broadcast | $\{T; Y\}$ |

Hash partitioning on columns $C_1, C_2, \ldots, C_n$ produces a non-ordered collection of partitions. This is similar to grouping so hash partitioning is indicated by $\{C_1, C_2, \ldots, C_n\}^g$. The order of partitioning columns does not matter, that is, $\{\ldots, C_i, \ldots, C_j, \ldots\}^g \Leftrightarrow \{\ldots, C_j, \ldots, C_i, \ldots\}^g$.

Range partitioning on columns $C_1, C_2, \ldots, C_n$ produces an ordered collection of partitions. Range partitioning is denoted by $\{C_1^{o_1}, C_2^{o_2}, \ldots, C_m^{o_m}\}$, $o_i \in \{o\uparrow, o\downarrow\}$. The shorthand $\{C_1^o, C_2^o, \ldots, C_m^o\}$ or $\{C_1, C_2, \ldots, C_m\}^o$ is used if the sort order on individual columns is not important. For range partitioning, the order of partitioning columns does matter.

In a non-deterministic partitioning scheme (round-robin and random partitioning), which partition a row is assigned to is independent on its content. They use no partitioning columns so this form of partitioning is indicated by $\emptyset$.

B. Properties After a Merge Operator

A merge operator produces a single output. Its local properties depend on the local properties of the input and the merge operator type: random merge, sort merge, concat merge and sort-concat merge. Table IV summarizes the structural properties after a full merge, depending on the type of merge operator and whether the input partitioning is ordered or non-ordered.

TABLE IV

Structural Properties of the Result after a Full Merge

| | Input Properties $\{X^g; Y\}$ | Input Properties $\{X^o; Y\}$ |
|---|---|---|
| Random Merge | $\{\bot; \emptyset\}$ | $\{\bot; \emptyset\}$ |
| Sort merge on $S^o$ | 1). $\{\bot; S^o\}$ if $Y \Rightarrow S^o$<br>2). $\{\bot; \emptyset\}$ otherwise | 1). $\{\bot; S^o\}$ if $Y \Rightarrow S^o$<br>2). $\{\bot; \emptyset\}$ otherwise |
| Concat merge | 1). $\{\bot; \{X^g, Z\}\}$ if $Y \Rightarrow \{X^g; Z\}$<br>2). $\{\bot; \emptyset\}$ otherwise | 1). $\{\bot; \{X^g, Z\}\}$ if $Y \Rightarrow \{X^g; Z\}$<br>2). $\{\bot; \emptyset\}$ otherwise |
| Sort-concat merge on $S^o$ | 1). $\{\bot; \{X^g, Z\}\}$ if $Y \Rightarrow \{X^g; Z\}$<br>2). $\{\bot; \emptyset\}$ otherwise | 1). $\{\bot; Y\}$ if $S^o \Leftrightarrow X^o$ and $Y \Rightarrow S^o$<br>2). $\{\bot; \emptyset\}$ otherwise |

A random merge does not guarantee any row order in the result, so no local properties can be derived for the output. For a sort-merge, there are two cases. If the local properties of the input imply that the input streams are sorted on the columns used in the merge, the output will be sorted, otherwise not.

A concat merge operator maintains the row order within each source partition. If each source partition is grouped in a similar way to how it is non-ordered partitioned, the result of is also grouped, otherwise not.

EXAMPLE 1

Given inputs with properties $\{\{C_1, C_2\}^g; \{C_2^o, C_1^o, C_3^o\}\}$, concat merging generates an output with properties $\{\{C_1, C_2\}^g; \{\{C_1, C_2\}^g, C_3^o\}\}$, if the merge is part of repartitioning operation, and $\{\bot; \{\{C_1, C_2\}^g, C_3^o\}\}$, if it implements a full merge.

A sort-concat merge produces a sorted result if inputs are range partitioned and each partition is also sorted on the same columns as it is partitioned on.

EXAMPLE 2

A sort-concat full merge on $\{C_1^o, C_2^o\}$ of inputs with properties $\{\{C_1^o, C_2^o\}; \{C_1^o, C_2^o, C_3^g\}\}$ generates an output with properties $\{\bot; \{C_1^o, C_2^o, C_3^g\}\}$.

C. Properties After a Repartitioning Operator

The properties of the result after repartitioning depends on the partitioning scheme, the merge scheme and the local properties of the input. Table V summarizes the structural properties after repartitioning an input with properties $\{P; Y\}$ where P denotes any partition property.

TABLE V

Structural Properties of the Result After Repartitioning on X with Properties $\{P; Y\}$

| | Hash partitioning | Range partitioning |
|---|---|---|
| Random Merge | $\{X^g; \emptyset\}$ | $\{X^o; \emptyset\}$ |
| Sort merge on $S^o$ | 1) $\{X^g; S^o\}$ if $Y \Rightarrow S^o$<br>2) $\{X^g; \emptyset\}$ otherwise | 1) $\{X^o; S^o\}$ if $Y \Rightarrow S^o$<br>2) $\{X^o; \emptyset\}$ otherwise |
| Concat merge | 1) $\{X^g; \{X^g, Z\}\}$ if $Y \Rightarrow \{X^g; Z\}$<br>2) $\{X^g; \emptyset\}$ otherwise | 1) $\{X^o; \{X^g, Z\}\}$ if $Y \Rightarrow \{X^g; Z\}$<br>2) $\{X^o; \emptyset\}$ otherwise |
| Sort-concat merge on $S^o$ | 1) $\{X^g; \{X^g, Z\}\}$ if $Y \Rightarrow \{X^g; Z\}$<br>2) $\{X^g; \emptyset\}$ otherwise | 1). $\{X^o; Y\}$ if $S^o \Leftrightarrow X^o$ and $Y \Rightarrow S^o$<br>2). $\{X^o; \emptyset\}$ otherwise |

TABLE V-continued

Structural Properties of the Result After Repartitioning on X with Properties {P; Y}

|  | Non-determ. partitioning |
|---|---|
| Random Merge | {∅; ∅} |
| Sort merge on S° | 1) {∅; S°} if Y ⇒ S° |
|  | 2) {∅; ∅} otherwise |
| Concat merge | 1) {∅; {X$^g$, Z}} if Y ⇒ {X$^g$; Z} |
|  | 2) {∅; ∅} otherwise |
| Sort-concat merge on S° | 1) {∅, Y} if S° ⇔ X° and Y ⇒ S |
|  | 2) {∅; ∅} otherwise |

Determining Child Required Properties

How to determine required properties of the inputs for different physical operators will now be described. Table VI lists required input properties for the most common physical operators. Depending on whether the operator is executed in either partitioned or non-partitioned mode, it imposes different requirements on its inputs.

TABLE VI

Required Structural Properties of Inputs to Physical Operators

| | Non-Partitioned Version | Partitioned Version |
|---|---|---|
| Table Scan | {⊥; *} | {X; *}, X ≠ ∅ |
| Select | {⊥; *} | {X; *}, X ≠ ∅ |
| Project | {⊥; *} | {X; *}, X ≠ ∅ |
| Sort on S° (S ≠ ∅) | {⊥; {S°, *}} | {X°; S°}, X ≠ ∅, S° ⇒ X° |
| Hash Aggregate on G | {⊥; *} | {X; *}, ∅ ⊂ X ⊆ G, G ≠ ∅ |
| Stream Aggregate on G | {⊥; {G$^g$, *}} | {X; {G$^g$, *}}, ∅ ⊂ X ⊆ G, G ≠ ∅ |
| Nested-loop or Hash Join (equijoin on columns $J_1 = J_2$) | Both inputs {⊥; *} | Pair-wise Join: Input 1: {X; *}, ∅ ⊂ X ⊆ $J_1$; Input 2: {Y; *}, ∅ ⊂ Y ⊆ $J_2$; X ≡ Y Broadcast Join: Input 1: {T; *}; Input 2: {X; *}, X ≠ ∅ |
| Merge Join (equijoin on columns $J_1 = J_2$) | Input 1: {⊥; $S_1°$} Input 2: {⊥; $S_2°$} | Pair-wise Join: Input 1: {X; $S_1°$}, ∅ ⊂ X ⊆ $J_1$; Input 2: {Y; $S_2°$}, ∅ ⊂ Y ⊆ $J_2$; X ≡ Y Broadcast Join: Input 1: {T; $S_1°$}; Input 2: {Y; $S_2°$}, Y ≠ ∅ |

$J_1 = prefix(S_1°)$, $J_2 = prefix(S_2°)$

Table scan, select and project process individual rows and impose no requirements on their inputs, that is, it doesn't matter how the input data is partitioned, sorted, or grouped. Thus their input requirements are shown as {X; *} where X can be any set of columns.

In the partitioned mode, a sort of the complete input requires that the input be range partitioned on a prefix of the sort columns and each partition be sorted on the sort columns. Sorted output partitions are then obtained by a sort-merge.

For a hash aggregation to work correctly, all rows with the same value of the grouping columns must be in a single partition. This is guaranteed as long as the input is partitioned on a subset of the grouping columns. A stream aggregation also requires that the input be partitioned on a subset of the grouping columns. In addition, the rows within each partition must, as a minimum, be grouped on the grouping columns.

Consider two types of partitioned joins: pair-wise join and broadcast join. A pair-wise join takes two partitioned inputs. The inputs must be partitioned on a subset of the join columns and in the same way, that is, on the same set of equivalent columns into the same number of partitions. Broadcast join takes one partitioned input and one nonpartitioned input that is sent (broadcast) to each partition of the other input. It doesn't matter how the partitioned input is partitioned. These are the only requirements for a nested-loop or hash join. A merge join has the additional requirement that each partition be sorted on the join columns.

EXAMPLE 3

Suppose we are considering using a partitioned merge join to join tables R and S on $R.C_1=S.C_1$ and $R.C_2=S.C_2$. Based on the rules in Table VI, both inputs must be partitioned and sorted in the same way. The partitioning columns must be a subset of or equal to the join columns ({$R.C_1, R.C_2$} and {$S.C_1, S.C_2$}, respectively). A prefix of the sort columns must also be equal to the join columns on each input.

Each of the following requirements satisfies the restrictions and is thus valid input requirements. All the possibilities are not listed here and the exact sort order, o↑ and o↓, has been left unspecified.

{$R.C_1^g$; {$R.C_2°, R.C_1°$}} and {$S.C_1^g$; {$S.C_2°, S.C_1°$}}
{$R.C_2^g$; {$R.C_1°, R.C_2°$}} and {$S.C_2^g$; {$S.C_1°, S.C_2°$}}
{{$R.C_1, R.C_2$}$^g$; {$R.C_2°, R.C_1°$}} and {{$S.C_1, S.C_2$}$^g$; {$S.C_2°, S.C_1°$}}

As shown by the example, the requirements in Table VI for the child expressions are not always unique and can be satisfied in several ways. For instance, aggregation on {$C_1, C_2$} requires the input to be partitioned on {$C_1$}, {$C_2$}, or {$C_1, C_2$}. Conceptually, each requirement corresponds to one specific implementation. This situation could be handled by generating multiple alternatives, one for each requirement. However, this approach would generate a large number of alternatives, making optimization more expensive. Instead, required properties are allowed to cover a range of possibilities and enforcer rules, discussed in further detail below, are relied on to generate valid rewrites.

To this end, an optimizer in accordance with one embodiment encodes required structural properties as follows.

Partitioning requirement:
  Non-partitioned (⊥), broadcast (T) or partitioned mode
  If in partitioned mode, minimum partitioning column set $P_{min}$ and maximum partitioning column set $P_{max}$ (∅ ⊆ $P_{min}$ ⊆ $P_{max}$)
  If $P_{min}$ =∅, whether an explicit partitioning by some column is required so that P≠∅.
Sorting requirement:
  a list of sorting columns {$S_1°, S_2°, \ldots, S_n°$}, o∈{o↑, o↓}

Grouping requirement:
  a set of grouping columns $\{G_1, G_2, \ldots, G_n\}^g$

In the previous example of aggregation on $\{C_1, C_2\}$, the partitioning requirement would be $P_{min}=\emptyset$, $P_{max}=\{C_1, C_2\}$. This requirement is satisfied by hash or range partition with column set P where $P_{min} \subset P \subset P_{max}$.

The rules in Table VI do not consider requirements imposed on the operator by its parent. For instance, if a merge join is required to produce a result sorted on $\{C_1, C_2\}$ but its equality join predicates are on $\{C_3,\}$, there is no merge join implementation that could satisfy its sorting requirements, assuming that sorting on $\{C_3,\}$ does not imply sorting on $\{C_1, C_2\}$. In this case, this merge join is an invalid alternative—it can never produce an output that satisfies the requirements. The optimizer checks for such invalid alternatives and discards them immediately.

Property Matching

Property matching checks whether one set of properties $P_1$ satisfies another $P_2$, that is, whether $P_1 \Rightarrow P_2$. The optimizer ensures that a physical (sub)plan is valid by checking that its delivered properties satisfy the required properties. Matching of structural properties can be done by matching global and local properties separately.

$$\{P^\beta; \{\hat{A}_1, \hat{A}_2, \ldots, \hat{A}_n\}\} \Rightarrow \{Q^\beta; \{\hat{B}_1, \hat{B}_2, \ldots, \hat{B}_n\}\}$$
$$\Leftrightarrow$$
$$P^\beta \Rightarrow Q^\beta \text{ and } \{\hat{A}_1, \hat{A}_2, \ldots, \hat{A}_n\}\} \Rightarrow \{Q^\beta; \{\hat{B}_1, \hat{B}_2, \ldots, \hat{B}_n\}\}$$

However, two structural properties may be equivalent even if they appear different because of functional dependencies and column equivalences. In some embodiments, their original forms are not simply compared, but instead they are first converted to normalized form. The basic idea of the normalization procedure is as follows: a) in each partitioning, sorting, grouping property, and functional dependency, replace each column with the representative column in its equivalence class, then b) in each partitioning, sorting and grouping property, remove columns that are functionally determined by some other columns.

Global and local properties are matched separately. Normalization and matching of local properties (sorting and grouping) have been studied extensively and are known in the art. Matching of global properties (partitioning) is based on inference rules (2), (3), and (5) discussed above. Recall that required properties are not always unique but may encode multiple alternatives, which results in additional matching opportunities.

EXAMPLE 4

We want to test whether the structural properties $P_1=\{\{C_7, C_1, C_3\}^g; \{C_6^{o\uparrow}, C_2^{o\downarrow}, C_5^{o\uparrow}\}\}$ satisfy the structural properties $P_2=\{\{C_1, C_2, C_4\}^g; \{\{C_1, C_2\}^g\}\}$. We know that the data satisfies the FD $\{C_6, C_2\} \rightarrow \{C_3\}$. There are two column equivalence classes $\{C_1, C_6\}$ and $\{C_2, C_7\}$ with $C_1$ and $C_2$ as representative columns, respectively.

After replacing columns by representative columns, we have
  $P_1=\{\{C_2, C_1, C_3\}^g; \{C_1^{o\uparrow}, C_2^{o\downarrow}, C_5^{o\uparrow}\}\}$
  $P_2=\{\{C_1, C_2, C_4\}^g; \{\{C_1, C_2\}^g\}\}$
  $\{C_1, C_2\} \rightarrow \{C_3\}$.

Next we apply the functional dependency to eliminate $C_3$, which changes $P_1$ to
  $P_1=\{\{C_2, C_1\}^g; \{C_1^{o\uparrow}, C_2^{o\downarrow}, C_5^{o\uparrow}\}\}$
while $P_2$ is unchanged.

We first consider global properties. We want to prove that $\{C_2, C_1\}^g \Rightarrow \{C_1, C_2, C_4\}^g$. According to the expansion rule for global properties (inference rule (2)), the implication holds and thus the global properties match.

For local properties, we need to show that $\{C_1^{o\uparrow}, C_2^{o\downarrow}, C_5^{o\uparrow}\} \Rightarrow \{\{C_1, C_2\}^g\}$. Applying the truncation rule for local properties (inference rule (1)), we obtain $\{C_1^{o\uparrow}, C_2^{o\downarrow}\} \Rightarrow \{\{C_1, C_2\}^g\}$ because sorting implies grouping (inference rule (4)).

Since both global and local properties are matches, we deduce that $P_1$ satisfy $P_2$.

Enforcer Rules

This section describes optimization rules that automatically introduce data exchange operators and thus seamlessly generate and optimize distributed query plans. The optimization framework may be enhanced in two ways.

For each logical operator, both nonpartitioned and partitioned implementations are considered, as long as they can ever satisfy their requirements.
  A series of enforcer rules (explained below) may be employed to modify requirements for structural properties, for instance, from non-partitioned to partitioned, or from sorted to nonsorted, etc.

Together with other optimization rules and property inferences, this enables the optimizer to consider both serial and parallel in a single integrated framework. It greatly enhances the power of a traditional query optimizer without dramatic infrastructure changes.

The following is a simple example of sort optimization. Suppose that, during optimization, there is a request to optimize an expression with a specific sort requirement S. The optimizer then considers different alternative physical operators for the root operator of the expression tree, derives what properties their inputs must satisfy, and requests an optimal plan for each input. There are typically three possible ways of ensuring that the result will be sorted. It is up to the optimizer to decide which plan is the best based on its cost estimates.

If a physical operator itself can generate a sorted output, try this operator and push requirements imposed by the operator itself to its child expressions.
  If a physical operator retains the input order, try this operator and push the sort requirement plus requirements imposed by the operator itself to its child expressions.
  Otherwise, try the operator but add an explicit sort operator matching the requirement and then optimize the child expressions without the sort requirement.

In the last case, the optimizer enforces a sort requirement on top of the physical operator. Such optimization rules are referred to herein as enforcer rules. Grouping requirements can be handled in a similar way, except there may not be an explicit group-only operator. A grouped result is usually produced as a side-effect of another operator, for example, a one-to-many nested-loop join.

A data exchange operator is similar to sorting. Its only effect is to change structural properties; it does not add or eliminate rows, nor does it modify individual rows in any way. Therefore, data exchange operators are modeled as enforcers of structural properties.

Algorithm 2 shows simplified pseudo-code for enforcing partitioning. For simplicity, handling of sorting and grouping requirements is not shown. When a sorting requirement exists, both sort-merge exchange and regular exchange operations are considered. Additionally, the details of the partitioning requirement are ignored.

```
Algorithm 2: EnforceDataExchange(expr, reqd)
Input: Expression expr, ReqdProperties reqd
ReqdProperties reqdNew;
    if Serial(reqd) then
        /*Require a serial output */
        AddExchange(FullMerge);
        reqdNew = GenParallel(reqd);
        Optimize(expr, reqdNew);
    else
        /*Require a parallel output */
        /*Enumerate all possible partitioning
        properties that $P_{min} \subseteq P \subseteq P_{max}$ */
        foreach valid partition schema P do
            /*Case 1: repartition */
            AddExchange(Repartition);
            /*Generate new partitioning requirements
            for its children; remove specific
            partitioning columns */
            reqdNew = GenParallel(reqd);
            Optimize(expr, reqdNew);
            /*Case 2: initial partition */
            AddExchange(InitialPartition);
            /*Force the child to generate a serial
            output */
            reqdNew = GenSerial(reqd);
            Optimize(expr, reqdNew);
        end
    end
return;
```

Although the pseudo-code is much simplified, it captures the core ideas of enforcing partitioning requirements. For any expression with particular partitioning requirements, the optimizer 1) uses an operator that itself satisfies the requirements; 2) uses a partition-preserving operator and pushes the requirements to its children; 3) adds data exchange operators that allow the requirements for its child expressions to be relaxed or modified. The optimizer tries all the alternatives and selects the best plan based on estimated costs.

Enforcer rules can seamlessly enable a single instance of an operator to work on a partitioned input by introducing a full merge operator. It can enable multiple instances of an operator to work on a non-partitioned input by introducing an initial partition operator. It can also enable multiple instances of an operator with specific partitioning requirements to work on any partitioned input sets by introducing a repartition operator.

EXAMPLE 5

Assume we optimize a filter operator with a requirement that its results must be partitioned on $\{C_1, C_2\}$. Since the filter operator itself cannot generate a partitioned output, the optimizer considers at least the following three alternatives.
1) Keep the filter operator and propagate the partition requirement to its child expression.
2) Add a repartition operator on $\{C_1, C_2\}$ before the filter operator. The child expression of the repartition operator can be partitioned in any way.
3) Add an initial partitioning operator on $\{C_1, C_2\}$ before the filter operator. The child expression of the repartition operator has to produce a non-partitioned output.

If the child expression turns out to produce its results already partitioned on $\{C_1, C_2\}$, possibly because the inputs are partitioned in the same way or there is an explicit partition before, the first choice is likely to be the cheapest. In such a plan, no additional enforcer (partitioning) is needed.

The number of alternatives generated by enforcer rules could be large so the optimizer may apply cost-based heuristics to prioritize alternatives and prune out less promising ones.

Exemplary System

Figure 3:
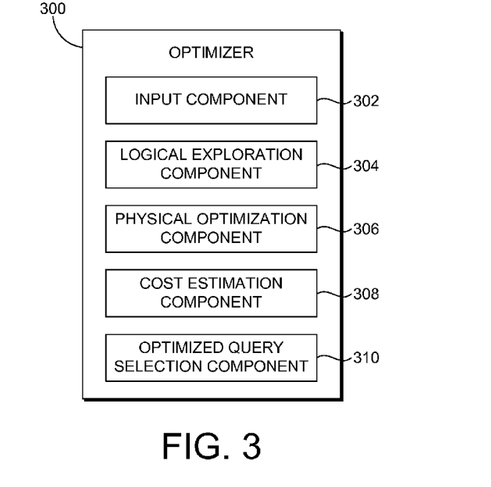
FIG. 3 is a block diagram of an exemplary optimizer in accordance with an embodiment of the present invention.

Referring now to FIG. 3, a block diagram is provided illustrating an exemplary optimizer 300 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In accordance with embodiments of the present invention, the optimizer 300 uses comprehensive property reasoning about partitioning, grouping, and sorting properties as described hereinabove for query optimization. The optimizer 300 includes an input component 302, which functions to receive input for query optimization. The input may include a query expression and a set of requirements. The query expression may be represented as a tree of logical operators.

The logical exploration component 304 operates on the query expression to generate new logical query expressions. Each logical query expression is represented as a tree of logical operators. In particular, the logical exploration component 304 applies transformation rules to generate the new logical query expressions by identifying alternative logical operators for the logical operators of the input query expression.

Using the logical query expressions provided by the logical exploration component 304, the physical optimization component 306 applies implementation rules to convert logical operators to physical operators. As will be described in further detail below with reference to FIG. 4, the physical optimization component 306 employs property reasoning about partitioning, grouping, and sorting properties to analyze alternative physical operators and identify valid execution plans. The physical optimization component 306 considers alternative physical operators for each logical operator of each logical query expression identified by the logical exploration component 304.

The cost estimation component 308 operates to analyze the valid execution plans and estimate costs associated with each valid execution plan. Based on the cost estimates, the optimized query selection component 310 selects the execution plan with the lowest cost as the execution plan to be implemented.

Figure 4:
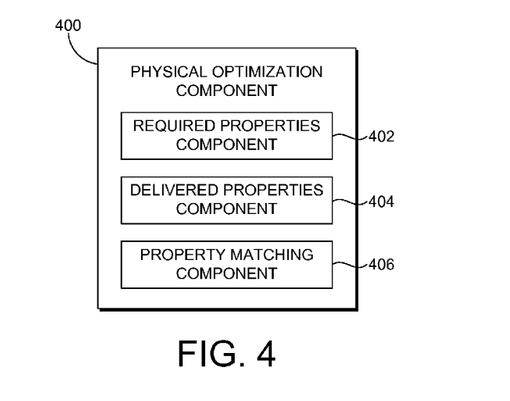
FIG. 4 is a block diagram of an exemplary physical optimization component of an optimizer in accordance with an embodiment of the present invention.

Turning to FIG. 4, a block diagram is provided that illustrates a physical optimization component 400 of an optimizer in accordance with an embodiment of the present invention. As shown in FIG. 4, the physical optimization component 400 includes a required properties component 402, a delivered properties component 404, and a property matching component 406.

The required properties component 402 operates to determine required structural properties of the inputs for different physical operators being considered by the optimizer for each logical operator of the various logical query expressions. The required properties component 402 uses the comprehensive property reasoning discussed above to determine required partitioning, grouping, and sorting properties of inputs to physical operators.

The delivered properties component 404 operates to determine the structural properties of the outputs from the various physical operators. As with the required properties component 402, the delivered properties component 404 uses the comprehensive property reasoning discussed above to determine the delivered partitioning, grouping, and sorting properties of outputs from the various physical operators.

The optimizer 400 also includes a property matching component 406, which operates to compare required and delivered properties. In particular, the property matching component 406 determines whether delivered properties satisfy corresponding required properties. This allows the optimizer to identify valid plans while removing invalid plans from consideration. As discussed hereinabove, property matching includes comparing partitioning, grouping, and sorting properties of a set of delivered properties against the partitioning, grouping, and sorting properties of a set of required properties.

In some embodiments, the physical optimization component 400 may employ enforcer rules in query optimizations. As discussed above, the enforcer rules allow structural property requirements to be modified to introduce different alternatives for consideration by the optimizer.

Exemplary Flow Diagrams

Figure 5:
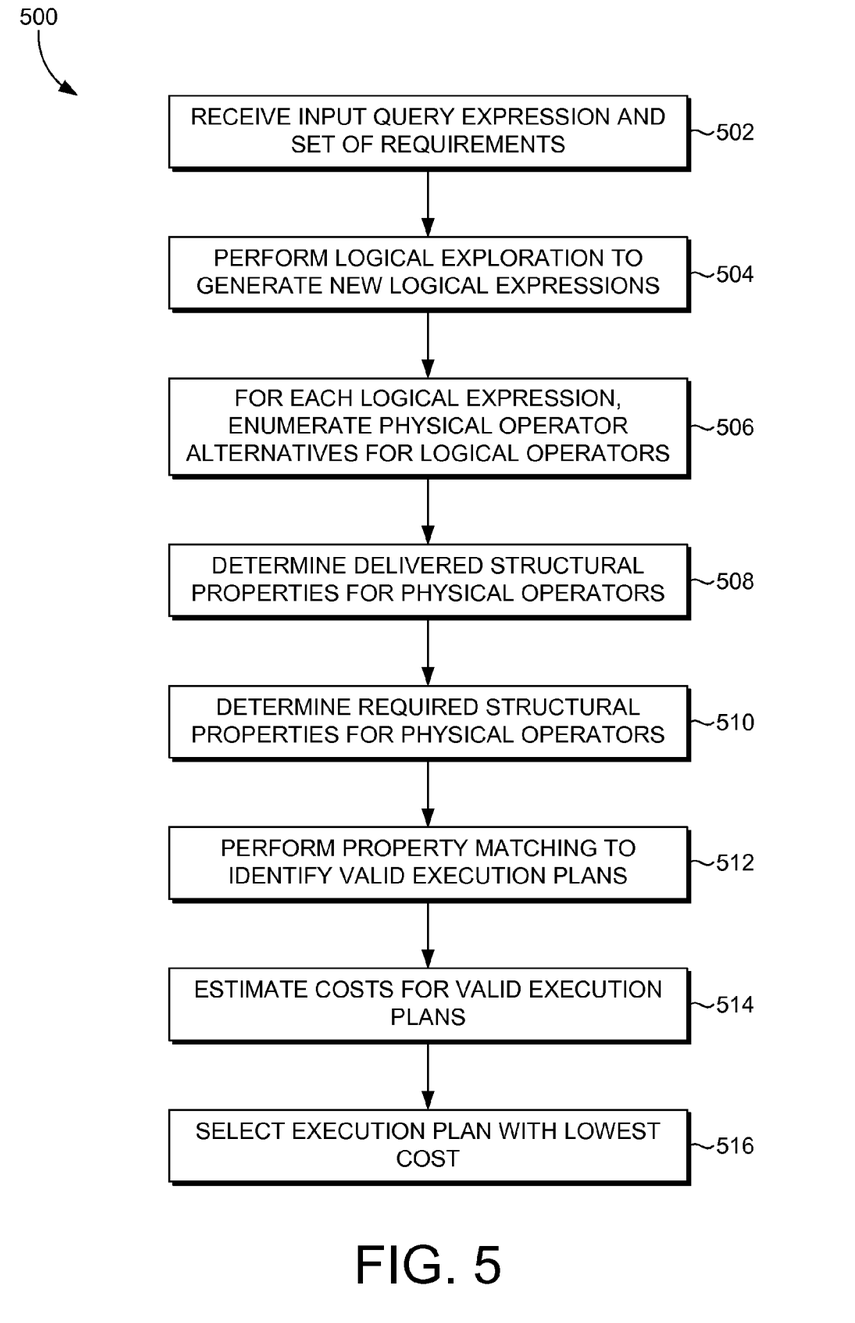
FIG. 5 is a flow diagram showing a method for optimizing a query expression using property reasoning that considers partitioning, grouping, and sorting properties in accordance with an embodiment of the present invention.

With reference now to FIG. 5, a flow diagram is provided that illustrates a method 500 for optimizing a query expression using property reasoning that considers partitioning, grouping, and sorting properties in accordance with an embodiment of the present invention. Initially, as shown at block 502, a query expression and set of requirements are received as input for query optimization purposes. The input query expression may be represented as tree of logical operators. Logical exploration is performed based on the input query expression to generate new logical query expressions, as shown at block 504. Logical exploration includes identifying alternative logical operators for each of the logical operators in the input query expression to generate new logical query expressions.

For each logical query expression, physical operator alternatives are enumerated for each logical operator, as shown at block 506. The delivered structural properties of output for the physical operators are determined at block 508. Determining the delivered structural properties is based on comprehensive reasoning regarding partitioning, grouping, and sorting properties as discussed hereinabove. Additionally, as shown at block 510, required structural properties are determined for the physical operators. Determining the required structural properties is also based on comprehensive reasoning regarding partitioning, grouping, and sorting properties.

Property matching is performed at block 512 to identify valid execution plans. Property matching includes determining whether delivered structural properties satisfy corresponding required structural properties. Based on the property matching, valid execution plans are identified in which the delivered structural properties satisfy corresponding required structural properties, while invalid plans are removed from consideration. As shown at block 514, costs are estimated for each of the valid execution plans. An execution plan with the lowest cost is selected at block 516 as the optimized execution plan.

Figure 6:
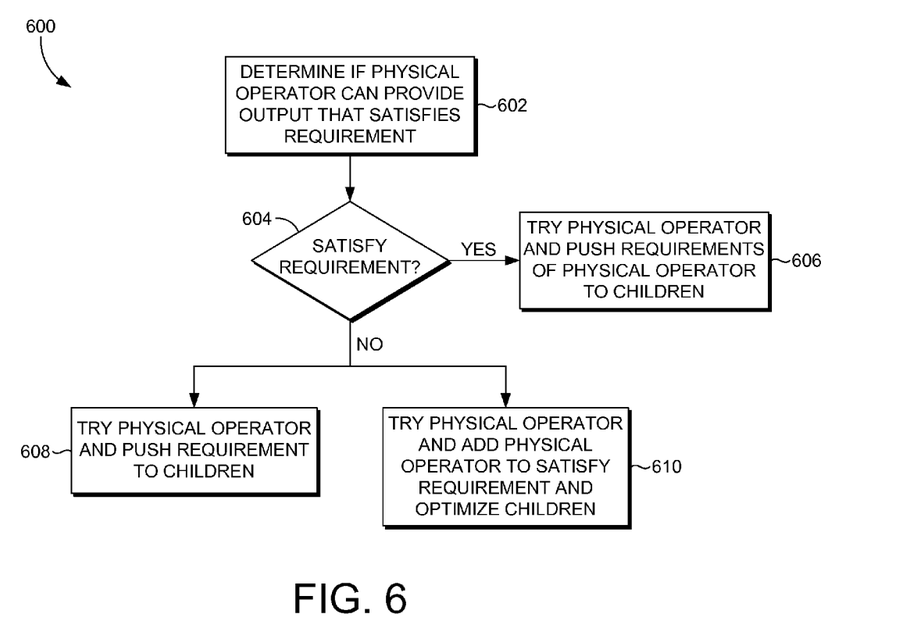
FIG. 6 is a flow diagram showing a method for employing enforcer rules to modify requirements of structural properties in accordance with an embodiment of the present invention.

Referring now to FIG. 6, a flow diagram is provided that illustrates a method 600 for employing enforcer rules to modify requirements of structural properties in accordance with an embodiment of the present invention. As shown at block 602, a determination is made regarding whether a physical operator can provide an output that satisfies a particular structural property requirement. If it is determined at block 604 that the physical operator can provide an output that satisfies the particular requirement, the physical operator is considered and the structural property requirements of the physical operator are pushed to children expressions, as shown at block 606.

If it is determined at block 604 that the physical operator can not provide an output that satisfies the particular requirement but can preserve the structural properties, the physical operator is considered and the particular requirement is pushed to children expressions, as shown at block 608. As an alternative consideration for optimization purposes, as shown at block 610, the physical operator is considered, a new physical operator is added that can satisfy the particular requirement, and child expressions are optimized without the specific requirement. The optimizer may consider all the alternatives and select an execution plan with the lowest costs.

As can be understood, embodiments of the present invention provide an optimizer that uses comprehensive reasoning about partitioning, grouping, and sorting properties to identify an optimized query execution plan. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more hardware memory devices, not being a signal per se, storing computer-useable instructions that, when used by one or more computing devices, cause the one or more computing devices to perform a method comprising:

receiving an input query expression and a set of one or more physical property requirements, the input query expression being represented as an operator tree comprising a plurality of logical operators;

performing logical exploration by applying transformation rules to generate a plurality of logical query expressions with varying logical operators;

performing physical optimization for each logical query expression by applying implementation rules to convert logical operators to physical operators wherein physical optimization comprises:

for each physical operator considered for each logical operator, determining delivered structural properties output by the physical operator, the delivered structural properties including a partitioning property, a sorting property, and a grouping property, each defining a partition, sort, and group structure, respectively, of output data delivered from the physical operator;

for each physical operator considered for each logical operator, determining required structural properties as input for the physical operator, the required structural properties including a partitioning property, a sorting property, and a grouping property, each defining a partition, sort, and group structure, respectively, of input data required for the physical operator;

determining whether delivered structural properties satisfy corresponding required structural properties, wherein determining whether delivered structural properties satisfy corresponding required structural properties comprises:
(a) determining whether delivered partitioning properties satisfy required partitioning properties;
(b) determining whether delivered sorting properties satisfy required sorting properties; and
(c) determining whether delivered grouping properties satisfy required grouping properties;
identifying valid execution plans in which delivered structural properties satisfy required structural properties;
estimating costs associated with each of the valid execution plans; and
selecting, from the valid execution plans, an execution plan having a lowest cost as an optimized execution plan.

2. The one or more hardware memory devices of claim 1, wherein structural properties are represented by a combination of partitioning information and an ordered sequence of actions, each action either grouping on a set of columns or sorting on a single column.

3. The one or more hardware memory devices of claim 1, wherein satisfying each delivered structural properties to a corresponding required structural property comprises matching each delivered structural property to a corresponding required structural property.

4. The one or more hardware memory devices of claim 1, wherein determining whether delivered structural properties satisfy corresponding required structural properties comprises converting structural properties to normalized form.

5. The one or more hardware memory devices of claim 4, wherein converting structural properties to normalized form comprises:
in each partitioning property, sorting property, grouping property, and functional dependency, replacing each column with a representative column in an equivalence class; and
in each partitioning property, sorting property, and grouping property, removing columns that are functionally determined by some other columns.

6. The one or more hardware memory devices of claim 1, wherein determining whether delivered structural properties satisfy corresponding required structural properties comprises using inference rules to determine whether delivered structural properties satisfy required structural properties.

7. The one or more hardware memory devices of claim 1, wherein both non-partitioned and partitioned implementations are considered for each logical operator.

8. The one or more hardware memory devices of claim 1, wherein enforcer rules are employed to modify structural property requirements.

9. The one or more hardware memory devices of claim 8, wherein employing enforcer rules comprises:
determining whether a first physical operator can provide an output that satisfies a particular structural property requirement;
when the first physical operator can provide an output that satisfies the particular structural property requirement, considering the first physical operator for optimization and pushing structural property requirements imposed by the first physical operator to child expressions;
when the first physical operator cannot provide an output that satisfies the particular structural property requirement, and the first physical operator can preserve structural property requirements, considering the first physical operator for optimization and pushing the particular structural property requirement to child expressions, and
when the first physical operator cannot provide an output that satisfies the particular structural property requirement, considering the first physical operator for optimization, adding a new physical operator that satisfies the particular structural property requirement, and optimizing child expressions without imposing the particular structural requirement on child expressions.

10. One or more hardware memory devices, not being a signal per se, storing software components useable by one or more computing devices to provide query optimization, the software components comprising:
a required properties component for determining required structural properties for physical operators being considered during query optimization, the required structural properties including structural property requirements of inputs to the physical operators, the required structural properties including partitioning properties, grouping properties, and sorting properties, each defining the partition, sort, and group structure, respectively, of input data required from physical operators;
a delivered properties component for determining delivered structural properties for the physical operators, the delivered structural properties including structural properties of outputs from the physical operators, the delivered structural properties including partitioning properties, grouping properties, and sorting properties, each defining the partition, sort, and group structure, respectively, of output data delivered from physical operator; and
a property matching component for determining whether delivered structural properties satisfy required structural properties to identify one or more valid execution plans, determining whether delivered structural properties satisfy required structural properties, wherein determining whether delivered structural properties satisfy corresponding required structural properties comprises:
(a) determining whether delivered partitioning properties satisfy required partitioning properties;
(b) determining whether delivered sorting properties satisfy required sorting properties; and
(c) determining whether delivered grouping properties satisfy required grouping properties.

11. The one or more hardware memory devices of claim 10, wherein the software components further comprise an input component for receiving an input query expression and a set of one or more physical property requirements.

12. The one or more hardware memory devices of claim 11, wherein the software components further comprise a logical exploration component that applies transformation rules to the input query expression to generate a plurality of logical query expressions.

13. The one or more hardware memory devices of claim 12, wherein the software components further comprise a cost estimation component that estimates a cost associated with each valid execution plan.

14. The one or more hardware memory devices of claim 13, wherein the software components further comprise an optimized query selection component that selects an execution plan having a lowest cost.

15. The one or more hardware memory devices of claim 10, wherein structural properties are represented by a combination of partitioning information and an ordered sequence of actions, each action either grouping on a set of columns or sorting on a single column.

16. The one or more hardware memory devices of claim 10, wherein the property matching component further satisfies each delivered structural properties to a corresponding required structural property by matching each delivered structural property to a corresponding required structural property.

17. The one or more hardware memory devices of claim 10, wherein the property matching component determines whether delivered structural properties satisfy required structural properties by converting structural properties to normalized form, including in each partitioning property, sorting property, grouping property, and functional dependency, replacing each column with a representative column in an equivalence class, and in each partitioning property, sorting property, and grouping property, removing columns that are functionally determined by some other columns.

18. One or more hardware memory devices, not being a signal per se, storing computer-useable instructions that, when used by one or more computing devices, cause the one or more computing devices to perform a method comprising:
   determining whether a first physical operator can provide an output that satisfies a particular structural property requirement based on at least matching the first physical operator output and the particular structural property requirement, wherein matching comprises comparing the first physical operator output to the particular structural property, the particular structural property requirement defines a partition, sort, and group structure of input data required from the first physical operator
   when the first physical operator can provide an output that satisfies the particular structural property requirement, considering the first physical operator for optimization and pushing structural property requirements imposed by the first physical operator to child expressions; and
   when the first physical operator cannot provide an output that satisfies the particular structural property requirement, and the first physical operator can preserve structural property requirements, considering the first physical operator for optimization and pushing the particular structural property requirement to child expressions, and
   when the first physical operator cannot provide an output that satisfies the particular structural property requirement, considering the first physical operator for optimization, adding a new physical operator that satisfies the particular structural property requirement, and optimizing child expressions without imposing the particular structural requirement on child expressions.

19. The one or more hardware memory devices of claim 18, wherein the first physical operator comprises a particular delivered structural property that comprises at least one of a partitioning property, grouping property, and sorting property each defining a partition, sort, and group structure, respectively, of output data delivered from the first physical operator.

20. The one or more hardware memory devices of claim 18, wherein the method further comprises applying cost-based heuristics to prioritize physical operator alternatives and remove physical operator alternatives with higher costs.

* * * * *